(12) United States Patent  
Krisko et al.

(10) Patent No.: US 7,754,336 B2
(45) Date of Patent: Jul. 13, 2010

(54) CARBON NANOTUBE GLAZING TECHNOLOGY

(75) Inventors: Annette J. Krisko, Sauk City, WI (US); Keith J. Burrows, Cross Plains, WI (US)

(73) Assignee: Cardinal CG Company, Eden Prairie, MN (US)

( * ) Notice: Subject to any disclaimer, the term of this patent is extended or adjusted under 35 U.S.C. 154(b) by 460 days.

(21) Appl. No.: 11/771,653

(22) Filed: Jun. 29, 2007

(65) Prior Publication Data

US 2008/0280078 A1  Nov. 13, 2008

Related U.S. Application Data

(60) Provisional application No. 60/817,997, filed on Jun. 30, 2006.

(51) Int. Cl.
*B32B 9/00* (2006.01)

(52) U.S. Cl. ............... 428/426; 428/408; 428/428; 428/432

(58) Field of Classification Search ............. 428/34, 428/426, 688, 698; 977/742, 753, 723; 252/502
See application file for complete search history.

(56) References Cited

U.S. PATENT DOCUMENTS

| | | | |
|---|---|---|---|
| 3,234,062 A | | 2/1966 | Morris |
| 4,166,018 A | | 8/1979 | Chapin |
| 5,318,685 A | | 6/1994 | O'Shaughnessy |
| 5,536,347 A | | 7/1996 | Moran |
| 5,698,262 A | * | 12/1997 | Soubeyrand et al. ... 427/255.19 |
| 5,908,585 A | * | 6/1999 | Shibuta .................. 252/506 |
| 6,331,209 B1 | | 12/2001 | Jang |
| 6,420,092 B1 | | 7/2002 | Yang |
| 6,461,682 B1 | | 10/2002 | Crotty |
| 6,468,402 B1 | | 10/2002 | Vanderstraeten |
| 6,511,587 B2 | | 1/2003 | Vanderstraeten |
| 6,841,003 B2 | | 1/2005 | Kang |
| 6,858,197 B1 | | 2/2005 | Delzeit |
| 6,908,572 B1 | | 6/2005 | Derbyshire |
| 6,974,629 B1 | | 12/2005 | Krisko et al. |
| 7,060,241 B2 | | 6/2006 | Glatkowski |
| 7,117,914 B2 | | 10/2006 | Chick |

(Continued)

FOREIGN PATENT DOCUMENTS

EP 1 818 357 A1 8/2007

(Continued)

OTHER PUBLICATIONS

Machine Translation of JP 2004-075400 to Fukaya et al.*

(Continued)

*Primary Examiner*—Timothy M Speer
(74) *Attorney, Agent, or Firm*—Fredrikson & Byron, P.A.

(57) ABSTRACT

The invention provides a glazing that includes a substrate on which there is provided a coating comprising carbon nanotubes. The glazing can be an IG unit comprising two spaced-apart panes bounding a between-pane space, the IG unit having at least one exterior surface on which there is provided a transparent conductor coating comprising carbon nanotubes. The glazing can alternatively be a laminated glass assembly comprising two panes of glass and an interlayer comprising carbon nanotubes sandwiched therebetween. Monolithic substrate embodiments are also provided. In certain embodiments, the coating comprises both dielectric film and carbon nanotubes.

41 Claims, 12 Drawing Sheets

U.S. PATENT DOCUMENTS

| | | |
|---|---|---|
| 7,143,800 B2 | 12/2006 | Chick |
| 2001/0019738 A1 | 9/2001 | Vanderstraeten |
| 2002/0081465 A1 | 6/2002 | Vanderstraeten |
| 2002/0125129 A1 | 9/2002 | Vanderstraeten |
| 2002/0127349 A1 | 9/2002 | Vanderstraeten |
| 2004/0151835 A1 | 8/2004 | Croci |
| 2004/0265550 A1 | 12/2004 | Glatkowski |
| 2005/0031876 A1 | 2/2005 | Lu |
| 2005/0106094 A1 | 5/2005 | Kondo |
| 2005/0109280 A1 | 5/2005 | Chen |
| 2005/0137084 A1 | 6/2005 | Krisko |
| 2005/0158551 A1 | 7/2005 | Rhoads |
| 2005/0191493 A1 | 9/2005 | Glatkowski |
| 2005/0209392 A1 | 9/2005 | Luo et al. |
| 2005/0244991 A1 | 11/2005 | Mao |
| 2006/0057298 A1 | 3/2006 | Krisko |
| 2006/0057401 A1 | 3/2006 | Krisko |
| 2006/0118408 A1 | 6/2006 | Myli |
| 2006/0121315 A1 | 6/2006 | Myli |
| 2007/0081227 A1 | 4/2007 | Hartig |

FOREIGN PATENT DOCUMENTS

| | | |
|---|---|---|
| WO | 2006/020188 | 2/2006 |

OTHER PUBLICATIONS

Wei, et al., A novel SnO2 gas sensor doped with carbon nanotubes operating at room temperature, May 5, 2004, Sensors and Actuators B, 101, p. 81-89.*

Database WPI Week 200435 Thomson Scientific, London, GB; AN 2004-367081, XP002496177 & JP 2004 075400 A (Sekisui Chem Ind Co Ltd) Mar. 11, 2004 abstract.

Moon et al., Transparent Conductive Film Based on Carbon Nanotubes and PEDOT Composites, Diamond and Related Materials, Nov. 1, 2005, pp. 1882-1887, Elsevier Science Publishers, Amsterdam, NL, vol. 14, No. 11-12.

Kaempgen et al., Transparent Carbon Nanotube Coatings, Applied Surface Science, Oct. 15, 2005, pp. 425-429, Elsevier, Amsterdam, NL, vol. 252, No. 2.

International Search Report and Written Opinion, dated Oct. 6, 2008, 12 pages.

Cao et al., "Highly Bendable, Transparent Thin-Film Transistors That Use Carbon-Nanotube-Based Conductors and Semiconductors with Elastomeric Dielectrics", Adv. Mater. 2006, 18, 304-309.

Baughman et al., "Carbon Nanotubes—the Route Toward Applications", Science vol. 297, Aug. 2, 2002, pp. 787-792.

* cited by examiner

CARBON NANOTUBE GLAZING TECHNOLOGY

CROSS-REFERENCE TO RELATED APPLICATION

The present application claims priority to U.S. Application No. 60/817,997, filed Jun. 30, 2006, the entire disclosure of which is incorporated herein by reference.

FIELD OF THE INVENTION

The present invention provides coatings for substrates, such as glass and the like. More particularly, the invention provides coatings including carbon nanotubes. The invention also provides methods of depositing such coatings onto glass sheets and other substrates.

BACKGROUND OF THE INVENTION

Glass sheets and other substrates can be coated with a stack of transparent, metal-containing films to vary the optical properties of the coated substrates. Particularly desirable are coatings characterized by their ability to readily transmit visible light while minimizing the transmittance of other wavelengths of radiation, especially radiation in the infrared spectrum. Known coatings that reflect infrared radiation include low-emissivity coatings and also transparent conductor coatings, such as indium tin oxide ("ITO") coatings. These coatings are useful for reducing radiant heat transfer without impairing visible transmittance. Coated glass of this nature is useful as architectural glass and as automotive glass.

Coated glass sheets are often incorporated into glazings. At least three types of glazings are commercially available today. These three types are often referred to as single glazing, double glazing and triple glazing. Double glazings are the most common. They commonly include an insulating glazing unit ("IG unit") having a sealed space between two panes of glass. Coating on the glass imparts desirable optical properties into the glazing.

It is challenging to provide a glazing that exhibits a well balanced set of properties. For example, when a glazing includes a glass sheet bearing a coating, such as a low-emissivity coating, it is challenging to achieve a desired level of visible transmittance, low visible reflectance, good thermal insulating properties, neutral color, and good durability. In particular, it is difficult to identify specific combinations of film thicknesses and compositions that achieve an exceptional balance of coating properties. To achieve exceptional results for a particular property, one may consider a variety of potential coating adjustments. Many adjustments, however, adversely impact other desired coating properties.

It is also challenging to provide coated glass that can be produced in a cost-effective manner. For example, transparent conductor coatings, such as ITO coatings, can be expensive to produce. Materials for producing ITO coatings are also limited in supply. As a result, there is a need for an alternate transparent conductor coating in the marketplace. ITO coatings also may have less than desirable durability. For example, ITO coatings may be relatively prone to scratching. Thus, there is a need for a transparent conductor coating that can be produced in a cost-effective manner and also is durable.

Desirable properties are even more difficult to achieve when coatings are subjected to heat treatment. It is often necessary to heat coated glass sheets to temperatures at or near the melting point of glass to temper the glass or to enable it to be bent into desired shapes, such as curved automobile windshields. Tempering is important for glass in automobile windows, and particularly for glass in automobile windshields. Upon breaking, tempered glass desirably exhibits a break pattern in which the glass shatters into a great many small pieces, rather than into large dangerous shards. During tempering, coated glass is typically subjected to elevated temperatures on the order of about 700 degrees C. Moreover, coated glass often must be able to withstand such temperatures for substantial periods of time. Certain coatings, for example ITO coatings, may not withstand such high temperature processing without some deterioration. Thus, there is a need for a transparent conductor coating that can withstand high temperature processing.

Some glazings include laminated glass assemblies. Laminated glass assemblies typically include two panes of glass laminated together by a polymer interlayer. One limitation of conventional laminated glass assemblies resides in the strength of the polymer interlayers. In some cases, the interlayer may break down over time so that the adhesion between the panes also breaks down. Polymer interlayers are often thick so they can resist breaking down over time. It would be desirable to provide thinner and/or higher strength laminated glass assemblies. It would also be desirable to provide laminated glass assemblies with an interlayer that is both highly resistant to breaking down over time and durable to elevated temperatures.

SUMMARY OF THE INVENTION

An insulating glazing unit is provided comprising two spaced-apart panes bounding a between-pane space, the insulating glazing unit having a #4 surface on which there is provided a transparent conductor coating comprising carbon nanotubes. The transparent conductor coating can have a thickness, nanotube coverage, and composition selected to provide the unit with a $\Delta U$ of at least about 0.03, the $\Delta U$ being defined as an absolute value of a difference between the U value of the unit with the transparent conductor coating and the U value of the unit without the transparent conductor coating. In certain cases, the U value is of less than 0.24 or less than 0.21. The transparent conductor coating can provide an emissivity of less than about 0.25. In some cases, the transparent conductor coating has a thickness, nanotube coverage, and composition selected to provide a $\Delta T_v$ of less than about 5%, the $\Delta T_v$ being defined as an absolute value of a difference between visible transmittance of the unit with the transparent conductor coating and visible transmittance of the unit without the transparent conductor coating.

Certain embodiments of the invention provide a multiple-pane insulating glazing unit with at least two spaced-apart panes. The insulating glazing unit has at least one between-pane space and a desired surface on which there is provided a transparent conductor coating comprising carbon nanotubes. Here, the desired surface is an exterior surface of the unit, rather than an interior surface exposed to a between-pane space of the unit.

In some cases, the insulating glazing unit has a visible transmission between about 30% and about 75%. The unit can also have a #2 surface on which there is provided a low-emissivity coating. In certain cases, the low-emissivity coating comprises at least one infrared-reflective film comprising silver, said infrared-reflective film being located between two transparent dielectric films. The unit can also have a #1 surface on which there is provided a water-sheeting coating. The water-sheeting coating, for example, can comprise silica, titania, or both. The transparent conductor coating, the low-emissivity coating, and the water-sheeting coating (when all three such coatings are provided) can have a combined physical thickness of between about 1,000 angstroms and about 10,000 angstroms, such as about 1,000 angstroms and about 5,000 angstroms. In some embodiments, the insulating glazing unit has an exterior reflected color characterized by an $a_h$ color coordinate of between about +2 and about −6 and a $b_h$ color coordinate of between about +6 and about −6. Likewise, in some embodiments, the insulating glazing unit has a transmitted color characterized by an $a_h$ color coordinate of between about 0 and about −6 and a $b_h$ color coordinate of between about +6 and about −6.

A glazing is also provided comprising a transparent pane having a major surface on which there is provided a coating comprising carbon nanotubes, the coating comprising both transparent dielectric film and the carbon nanotubes, wherein the coating has a thickness of greater than 200 angstroms and less than 4,000 angstroms. The major surface of the pane can have a total surface area of which the carbon nanotubes cover less than about 50 percent or less than about 30 percent of the total surface area of the major surface. The coating can have a surface resistance of less than about 100 ohms per square or less than about 20 ohms per square. The transparent dielectric film can be a metal oxide film and can be over at least some of the carbon nanotubes.

A glazing is also provided comprising a transparent pane on which there is provided a coating comprising carbon nanotubes, the coating having a thickness of less than about 4,000 angstroms, wherein the coating is located on a major surface of the transparent pane and wherein the carbon nanotubes provide coverage over at least about 1-2 percent of the major surface. The coated transparent pane can have a monolithic transmission of at least about 70 percent. The coating can have a thickness of less than about 1,500 angstroms and a surface resistance of less than about 100 ohms per square. The nanotube coverage can be provided at about 100 percent. In some cases, the glazing includes a further pane on which there is provided a coating comprising three infrared-reflective films each comprising silver.

Certain embodiments provide a glazing comprising a transparent pane with a major surface on which there is provided a coating consisting essentially of dielectric film and carbon nanotubes. In the present embodiments, the coating has a thickness of less than 10,000 angstroms, and the coating has a dielectric/carbon nanotube weight ratio of between about 2.3 and about 9999. The dielectric/carbon nanotube weight ratio is defined as the total weight of the dielectric film over the total weight of the carbon nanotubes.

A laminated glass assembly is also provided comprising two panes of glass and a coating comprising carbon nanotubes sandwiched between the two panes of glass. In some cases, the coating is contiguous to a polymeric layer.

One embodiment provides a laminated glass assembly comprising first and second panes of glass. In the present embodiment, the first pane has a bonded interior surface and an exposed exterior surface, and the second pane has a bonded interior surface and an exposed exterior surface. Between the first and second panes of glass, there is an interlayer that holds the two glass panes together, such that the interior surfaces of the first and second panes are bonded to the interlayer. The interlayer here comprises carbon nanotubes.

An insulating glazing unit is also provided, the unit being mounted in a frame on a wall of a building, the unit having a #1 surface exposed to an outdoor environment and a #2 surface exposed to a between-pane space of the unit, wherein the unit has an inboard pane with a room-side surface exposed to an indoor environment of the building, wherein a coating comprising carbon nanotubes is on the room-side surface, wherein the carbon nanotubes cover less than 100% of the room-side surface, and wherein the coating includes a transparent dielectric film over the carbon nanotubes. The coating comprising carbon nanotubes can have a thickness of less than about 4,000 angstroms or less than about 1,500 angstroms. The carbon nanotubes can cover less than about 50 percent or less than about 30 percent of the room-side surface.

An insulating glazing unit is also provided, the unit being mounted in a frame on a wall of a building is provided, the unit having a #1 surface exposed to an outdoor environment, wherein a water-sheeting coating is on the #1 surface, the unit having an inboard pane with a room-side surface exposed to an indoor environment of the building, wherein the coating comprising carbon nanotubes is on the room-side surface, and wherein the unit has an inner surface that is coated and is exposed to a between-pane space of the unit, wherein a low-emissivity coating is on said inner surface, and wherein the coating comprising carbon nanotubes, the low-emissivity coating, and the water-sheeting coating have a combined thickness of between about 1,000 angstroms and about 10,000 angstroms such as between about 1,000 angstroms and about 5,000 angstroms.

DETAILED DESCRIPTION OF PREFERRED EMBODIMENTS

Figure 1:
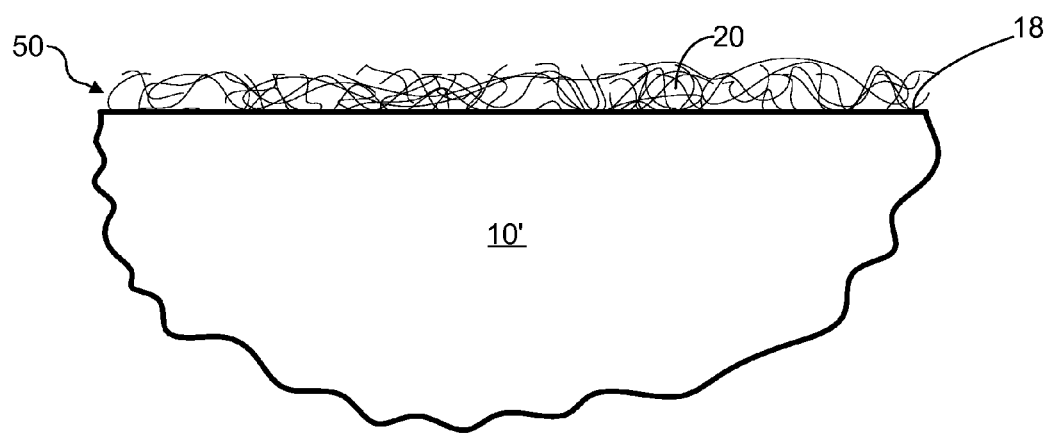
FIG. 1 is a schematic cross-sectional view of a substrate having a surface bearing a coating in accordance with an embodiment of the invention.

The following detailed description is to be read with reference to the drawings, in which like elements in different drawings have like reference numbers. The drawings, which are not necessarily to scale, depict selected embodiments and are not intended to limit the scope of the invention. Skilled artisans will recognize that the given examples have many alternatives that fall within the scope of the invention.

Many embodiments of the invention involve a coated substrate. A wide variety of substrate types are suitable for use in the invention. In some embodiments, the substrate 10, 10' is a sheet-like substrate having generally opposed first 12, 16 and second 14, 18 major surfaces. For example, the substrate can be a sheet of transparent material (i.e., a transparent sheet). The substrate, however, is not required to be a sheet, nor is it required to be transparent.

The substrate can optionally be a component of any of a variety of building materials. Examples of anticipated applications include embodiments wherein the substrate is a sash (e.g., a window sash or a door sash), a siding panel (e.g., an aluminum siding panel), a tent panel, a tarpaulin (e.g., a fluorocarbon polymer tarpaulin), a plastic film (e.g., a fluorocarbon plastic film), a roofing shingle, a window blind (such as a metal, plastic, or paper window blind), a paper screen (e.g., a shoji), a railing, a baluster, or an escutcheon. In one embodiment, the substrate is a ceramic tile, such as a wall, ceiling, or floor tile. In another embodiment, the substrate is a glass block. A variety of suitable glass blocks can be obtained commercially from Saint-Gobain Oberland (Koblenz, Germany). In still other embodiments, the substrate is a polyester film, a polyethylene film, a terephthalate film, etc. Suitable films of this nature can be obtained commercially from Nippon Soda Co., Ltd. (Tokyo, Japan). In further embodiments, the substrate is a fence or wall, such as a noise-reduction fence or wall.

For many applications, the substrate will comprise a transparent (or at least translucent) material, such as glass or clear plastic. For example, the substrate is a glass sheet (e.g., a window pane) in certain embodiments. A variety of known glass types can be used, and soda-lime glass will commonly be preferred. In certain preferred embodiments, the substrate is part of a window, skylight, door, shower door, or other glazing. In some cases, the substrate is part of a laminated glass assembly for an automobile windshield or an automobile side window. In other cases, the substrate is part of an exterior or interior rear-view mirror, a bumper, a hubcap, a windshield wiper, or an automobile hood panel, side panel, trunk panel, or roof panel. In other embodiments, the substrate is a piece of aquarium glass, a plastic aquarium window, or a piece of greenhouse glass. In these embodiments, the substrate can optionally be part of a laminated glass assembly. In a further embodiment, the substrate is a refrigerator panel, such as part of a refrigerator door or window. In still another embodiment, the substrate is part of an electromagnetic shielding device.

Substrates of various sizes can be used in the present invention. Commonly, large-area substrates are used. Certain embodiments involve a substrate 10 having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters. In some embodiments, the substrate is a jumbo glass sheet having a length and/or width that is between about 3 meters and about 10 meters, e.g., a glass sheet having a width of about 3.5 meters and a length of about 6.5 meters. Substrates having a length and/or width of greater than about 10 meters are also anticipated.

In some embodiments, the substrate 10' is a generally square or rectangular glass sheet. The substrate in these embodiments can have any of the dimensions described in the preceding paragraph and/or in the following paragraph. In one particular embodiment, the substrate is a generally rectangular glass sheet having a width of between about 3 meters and about 5 meters, such as about 3.5 meters, and a length of between about 6 meters and about 10 meters, such as about 6.5 meters.

Substrates of various thicknesses can be used in the present invention. In some embodiments, the substrate 10' (which can optionally be a glass sheet) has a thickness of about 1-5 mm. Certain embodiments involve a substrate 10' with a thickness of between about 2.3 mm and about 4.8 mm, and perhaps more preferably between about 2.5 mm and about 4.8 mm. In one particular embodiment, a sheet of glass (e.g., soda-lime glass) with a thickness of about 3 mm is used. In one group of embodiments, the thickness of the substrate (which can be glass, plastic, or another material) is between about 4 mm and about 20 mm. Thicknesses in this range, for example, may be useful for aquarium tanks (in which case, the substrate can optionally be glass or acrylic). When the substrate is float glass, it will commonly have a thickness of between about 4 mm and about 19 mm. In another group of embodiments, the substrate is a thin sheet (e.g., of glass) having a thickness of between about 0.35 mm and about 1.9 mm. Embodiments of this nature can optionally involve the substrate 10' being a sheet of display glass or the like.

In certain embodiments, the invention provides a glazing comprising a substrate, e.g., a transparent pane, on which there is provided a coating comprising carbon nanotubes. The glazing, for example, can be a single glazing, double glazing, or triple glazing. In some cases, the glazing is a single glazed monolithic window, door, skylight, etc. In other cases, it is a double glazed window, door, skylight, etc. In many cases, the glazing will comprise an insulating glazing unit. Commonly, the insulating glazing unit includes two transparent panes (optionally of glass) bounding a between-pane space. The between-pane space provides thermal insulation, and this insulating effect can optionally be enhanced by filling the space with an insulative gas such as argon or krypton.

Preferably, a transparent pane of the glazing bears a coating comprising carbon nanotubes. The carbon nanotubes can be of any kind known in the art. Generally speaking, carbon nanotubes are cylindrical carbon molecules that exhibit extraordinary strength, electrical and conductive properties. Carbon nanotubes are of two types: single-walled and multi-walled. A single-walled nanotube consists of a single cylinder whereas a multi-walled nanotubes comprises several concentric cylinders. A nanotube is often on the order of a few nanometers in diameter and up to several centimeters in length (e.g., between 100 nm and 700 cm, such as between hundreds of nanometers and several centimeters). In some embodiments, the present coating comprises a plurality of carbon nanotubes having an average length of greater than 500 nm, such as between 500 nm and 5 cm, and perhaps preferably between 5 microns and 5 cm. In some cases, a majority (optionally substantially all) of the carbon nanotubes are of lengths falling in one or more of the ranges noted in this paragraph. The coating can, in addition to the carbon nanotubes, include other carbon forms or other materials, such as materials that end up in the coating as by-products of the nanotube deposition or synthesis process. For example, metallic catalysts are often used to synthesize nanotubes and can end up in the coating as a byproduct.

The coating comprising carbon nanotubes imparts several desirable properties to the glazing. Carbon nanotubes are excellent thermal and electrical conductors along the axis of each tube, and good thermal insulators perpendicular to the tube axis. As a result, they can provide the glazing with low sheet resistance and low-emissivity. Thus, the coating can serve as a transparent conductor coating. Carbon nanotube coatings are also extremely durable to heat processing. Thus, they may be particularly durable to many processing methods, such as glass tempering and other elevated temperature processes. In particular, they are expected to be more durable than ITO transparent conductor coatings.

In some cases, the coating comprising carbon nanotubes (or at least a layer, or region, of the coating) consists essentially of carbon nanotubes, optionally together with other carbon-containing materials. In other cases, the coating (or at least a layer or region of the coating) comprises both carbon nanotubes and polymeric film. The polymeric film is an electrically conductive polymeric film in some cases and is used to protect (optionally over at least some of, over substantially all of, or over all of) the nanotubes. In certain embodiments, the polymeric film comprises a polyaniline polymer. For example, in some embodiments, the film comprises polyether urethane 4901, a material commercially available from Hi Tech Polymers, a company located in Cleveland, Ohio, USA.

In one preferred group of embodiments, the coating comprises both carbon nanotubes and transparent dielectric film. Some embodiments of this nature provide carbon nanotubes disposed in a ceramic matrix (e.g., a matrix of a transparent dielectric material, such as a metal oxide). The transparent dielectric film can include titanium oxide, titanium nitride, silicon oxide, silicon nitride, zinc oxide, tin oxide and/or others. In one preferred embodiment, the transparent dielectric component of the coating consists essentially of an inorganic material selected from the group consisting of metal oxides, metal nitrides, and metal oxynitrides.

The carbon nanotubes can optionally be combined with dielectric film to alter the properties of the dielectric film. For example, the nanotubes can be provided to increase roughness (and surface area), hardness, conductivity and/or other properties of the dielectric film. In one embodiment, the coating 50 comprises (and optionally consists essentially of) titanium oxide (e.g., $TiO_2$) and carbon nanotubes. Here, the titanium oxide can optionally be a film deposited over a layer of carbon nanotubes. The resulting coating may have a particularly high level of photoactivity due to increased roughness/surface area created by the carbon nanotubes. The nanotubes may also impart particularly low sheet resistance and/or high strength to the coated substrate. In some cases, the thus coated substrate is subjected to a post deposition heat treatment, such as tempering, heat strengthening, or another heat treatment that impacts the properties of the coating. In these cases, the coating may include both crystalline titania and the carbon nanotubes.

In some embodiments, the coating 50 has a particular dielectric/carbon nanotube weight ratio. The ratio, for example, can be about 2.3-9999 (e.g., about 2.3-999), or perhaps 9-9999 (e.g., about 9-999). The dielectric/carbon nanotube weight ratio is defined as the total weight of the dielectric material over the total weight of the carbon nanotubes. These ranges are examples: depending on the application, it may be desirable to vary the ratio. For example, a lower ratio may be desirable for electromagnetic shielding embodiments, while a higher ratio may be selected when particularly high visible transmission is desired.

When provided, the dielectric film can increase the durability of the coating. In some cases, the coating includes both carbon nanotubes and silica. In other cases, the coating includes both carbon nanotubes and silicon nitride (or silicon oxynitride). The silicon oxynitride embodiment, for example, can be varied (e.g., in terms of the relative amounts of oxide and nitride) so as to achieve different levels of refractive index. These embodiments may be preferred, for example, when it is desired to employ an amorphous or substantially amorphous dielectric film in combination with carbon nanotubes, as may be provided in a broader group of embodiments.

Thus, one group of embodiments provides a coating comprising (optionally consisting essentially of) carbon nanotubes and amorphous or substantially amorphous dielectric film. The carbon nanotubes, for example, may be embedded in a matrix of amorphous or substantially amorphous dielectric material. The dielectric material, for example, can be selected from the group consisting of silica, silicon nitride, and silicon oxynitride. One embodiment provides the amorphous dielectric film over the carbon nanotubes (optionally so as to entirely encase the carbon nanotubes), e.g., for durability purposes.

The coating 50 in certain embodiments is subjected to tempering, heat strengthening, a pulse of light, a pulse of plasma, or another heat treatment. Some of the present embodiments involve heat treating the carbon nanotube-containing coating (e.g., to a temperature exceeding 300 degrees C., or even exceeding 600 degrees C.) while the coating is exposed to an oxidizing atmosphere (e.g., air). Some embodiments provide a coating in the form of one or more films that are durable to such heat treatment in that the coating remains transparent, rather than browning or otherwise turning opaque in response to such heat treatment. The coating in these embodiments, for example, can advantageously consist essentially of carbon nanotubes and inorganic material (optionally selected from metal oxides, metal nitrides, and metal oxynitrides).

In one subgroup of the dielectric-carbon nanotube coating embodiments, the coating comprises electrically non-conductive dielectric material. For example, this may involve using $TiO_2$, $SiO_2$, or various mixtures of $TiO_2$ and $SiO_2$, to name just a few. The dielectric component of the coating 50 can optionally consist essentially of electrically non-conductive dielectric material.

In certain embodiments, the coating has a thickness of less than about 4,000 angstroms. In some embodiments of this nature, the coating 50 has a thickness in the range of between 200 and 4,000 angstroms. The coating in some cases is less than about 1,500 angstroms (perhaps even less than 1,000 angstroms). In another group of embodiments, though, the coating has a thickness of between 4,000 and 10,000 angstroms, such as about 6,000-7,000 angstroms. More generally then, the thickness may range between 200 and 10,000 angstroms. The thickness ranges noted in this paragraph can be used for any embodiment of the present disclosure.

The carbon nanotubes can be provided on the substrate using a number of known methods. Methods of synthesizing nanotubes include, but are not limited to, arc discharge, laser ablation, chemical vapor deposition, plasma enhanced chemical vapor deposition, pyrolytic deposition, and electrophoresis deposition. Once the carbon nanotubes are synthesized or otherwise obtained, they can be deposited on the substrate. Exemplary deposition methods include spray deposition, ink-jet printing, dispensing, spin-coating, brushing, dipping, and screen-printing. In certain embodiments, the carbon nanotubes are deposited using chemical vapor deposition. Suitable chemical vapor deposition methods for depositing nanotubes are described in U.S. patent application Ser. Nos. 09/556,816 and 10/945,814, the contents of which concerning synthesizing/depositing nanotubes are incorporated herein by reference. In other embodiments, the carbon nanotubes are deposited using spray deposition. In certain embodiments previously synthesized nanotubes can be obtained for example from Carbon Solutions, Inc., a company located in Riverside, Calif., USA. The synthesized nanotubes can be suspended in a solvent (e.g., water, isopropyl alcohol, toluene, etc.) and then the solvent and nanotubes can be sprayed onto the substrates. In certain cases, the nanotubes can be functionalized (e.g., by adding OH groups, COOH groups and the like to the nanotube surfaces) to make them easier to dissolve in the solvent. The nanotubes and solvent can also be subjected to ultrasonic mixing to help dissolve the nanotubes. Other suitable methods for depositing the carbon nanotubes are described in U.S. patent application Ser. Nos. 10/984,079, and 10/468,145, the contents of which concerning synthesizing/depositing nanotubes are incorporated herein by reference.

Once the carbon nanotubes are provided on a substrate, a dielectric film is optionally deposited over the nanotubes. The dielectric film can be deposited using known methods including, but not limited to, sputtering, chemical vapor deposition, pyrolytic deposition, evaporation, sol-gel deposition, and ion-assisted deposition. In certain embodiments, the dielectric film is deposited by sputtering, such as DC, AC and/or pulsed DC sputtering. One preferred method utilizes DC magnetron sputtering, which is commonly used in the industry and one embodiment of which is described in Chapin's U.S. Pat. No. 4,166,018, the teachings of which concerning sputtering techniques and equipment are incorporated herein by reference.

In some embodiments, a dielectric film is deposited over a substrate previously coated with carbon nanotubes by transporting the substrate through a sputter coater in which the dielectric film is applied. The sputter coater includes one or more targets that can be sputtered to deposit the dielectric film. In some cases, the coater is equipped with a plurality of targets carrying sputterable material formed of a dielectric (e.g., zinc aluminum oxide or titanium dioxide, optionally sub-oxides thereof). The target may be sputtered in an inert atmosphere (e.g., an argon atmosphere), or in a slightly oxidizing atmosphere, or in a slightly nitriding atmosphere, to deposit the desired dielectric material on the substrate. More commonly, though, a metallic target is provided and the dielectric film is deposited by sputtering a metal target in a reactive atmosphere. The metal reacts with the reactive gas (e.g., oxygen and/or nitrogen) in the atmosphere to form a dielectric. For example, a zinc oxide film can be deposited by sputtering a zinc target in an oxidizing atmosphere. Likewise, a titanium oxide film can be deposited by sputtering a titanium target in an oxidizing atmosphere. Also, a silicon nitride film can be deposited by sputtering a silicon target (which may be doped with aluminum or the like to improve conductivity) in a nitrogen atmosphere. A silica film can be deposited by sputtering a silicon target (or a Si—Al target) in an oxidizing atmosphere. A series of the desired targets, of course, would normally be used. The thickness of the film thus deposited can be controlled by varying the speed of the substrate and/or by varying the power and sputtering rate of each individual target. Certain preferable methods of sputter depositing dielectric films are described in Applicant's own U.S. Pat. No. 5,318,685 and patent application Ser. Nos. 09/024,240, 09/759,661, 09/044,681, 09/966,636, 10/032,901, and 10/008,949, the teachings of which concerning sputter deposition techniques and equipment are incorporated herein by reference.

Figure 2:
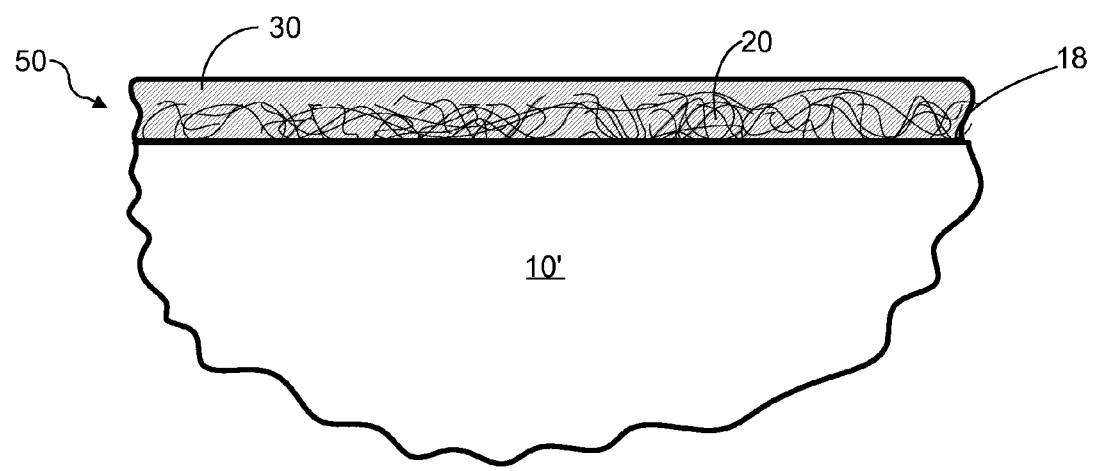
FIG. 2 is a schematic cross-sectional view of a substrate having a surface bearing a coating in accordance with another embodiment of the invention.
Figure 3:
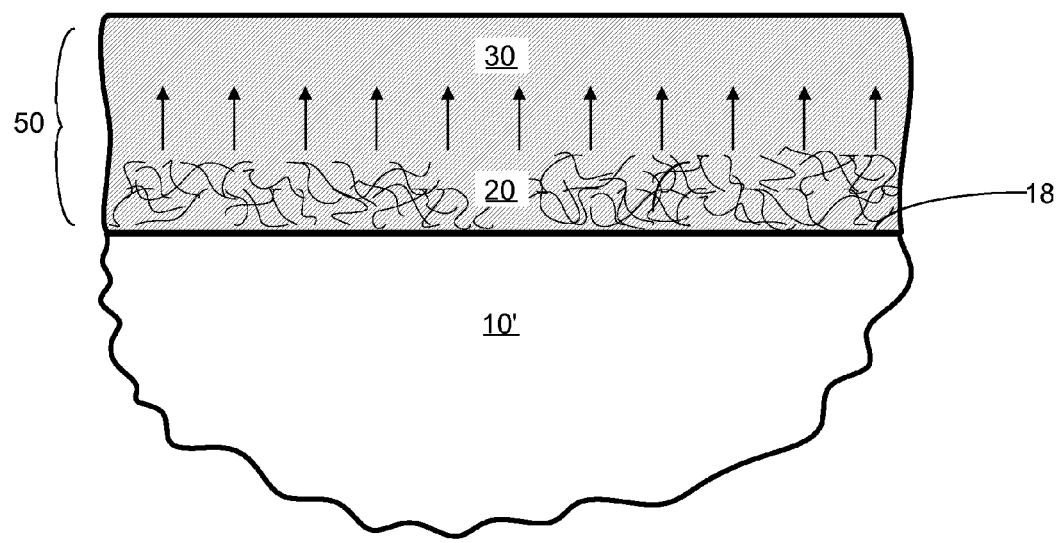
FIG. 3 is a schematic cross-sectional view of a substrate having a surface bearing a coating in accordance with another embodiment of the invention.

FIGS. 1-3 each illustrate a substrate 10' having a surface 18 bearing a coating 50 in accordance with different embodiments. The coating 50, for example, can be a transparent conductor coating, although this is by no means required.

Figure 11:
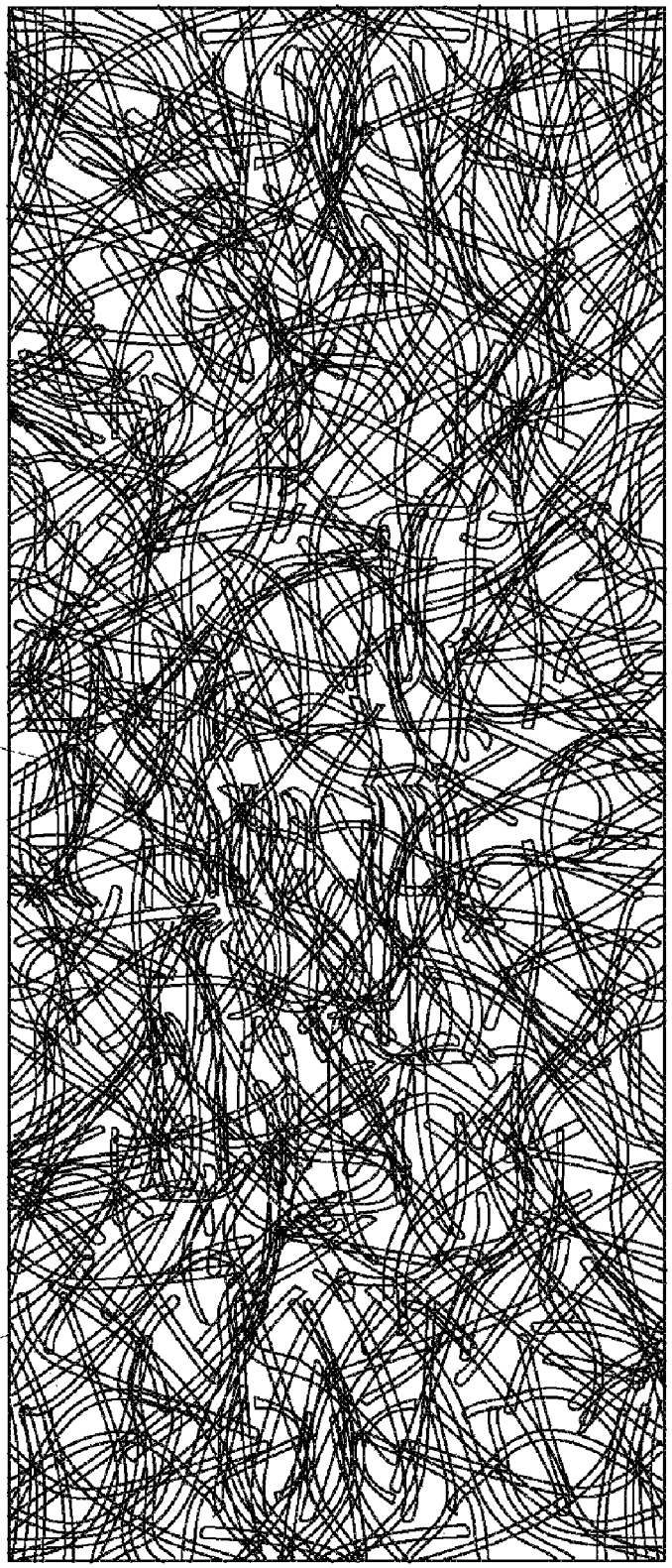
FIG. 11 is a schematic magnified top image of a surface bearing a coating comprising carbon nanotubes.
Figure 12:
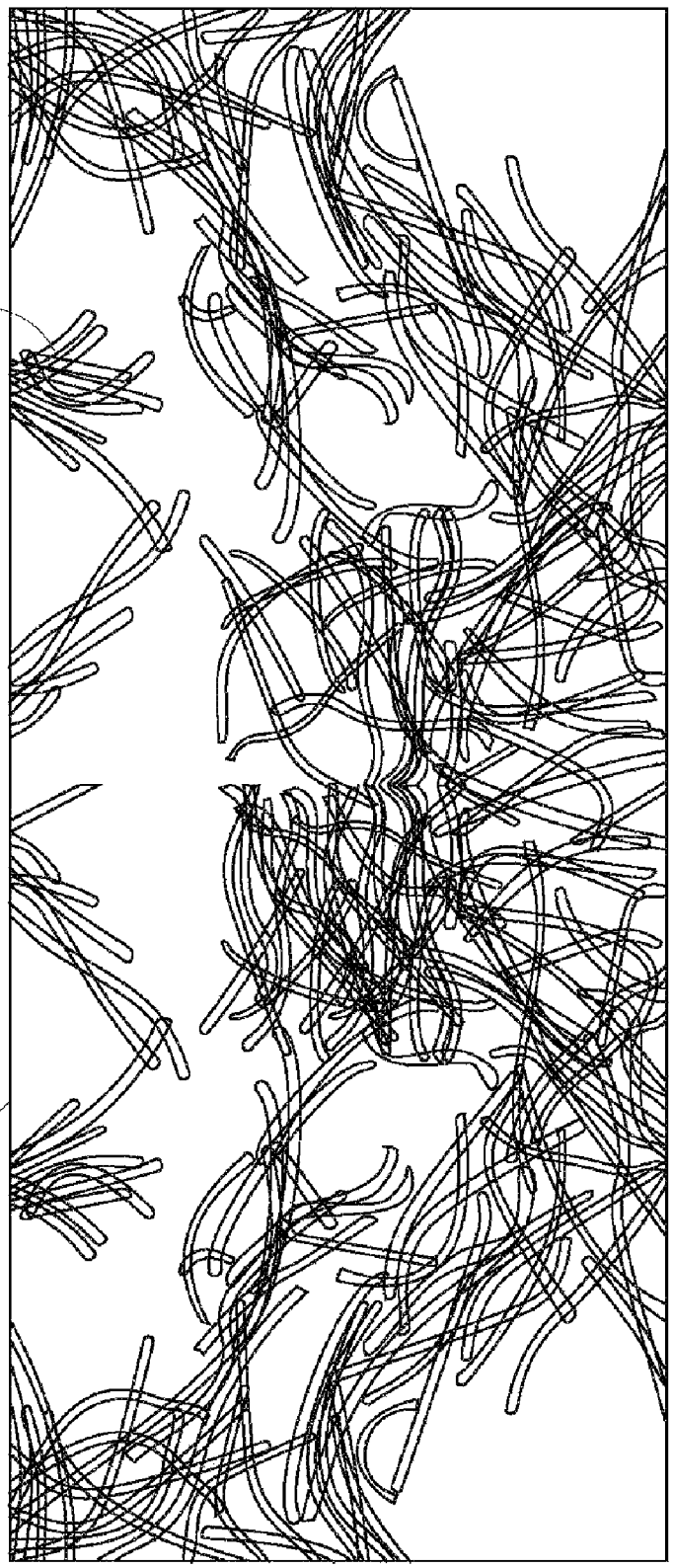
FIG. 12 is another schematic magnified top image of a surface bearing a coating comprising carbon nanotubes.
Figure 13:
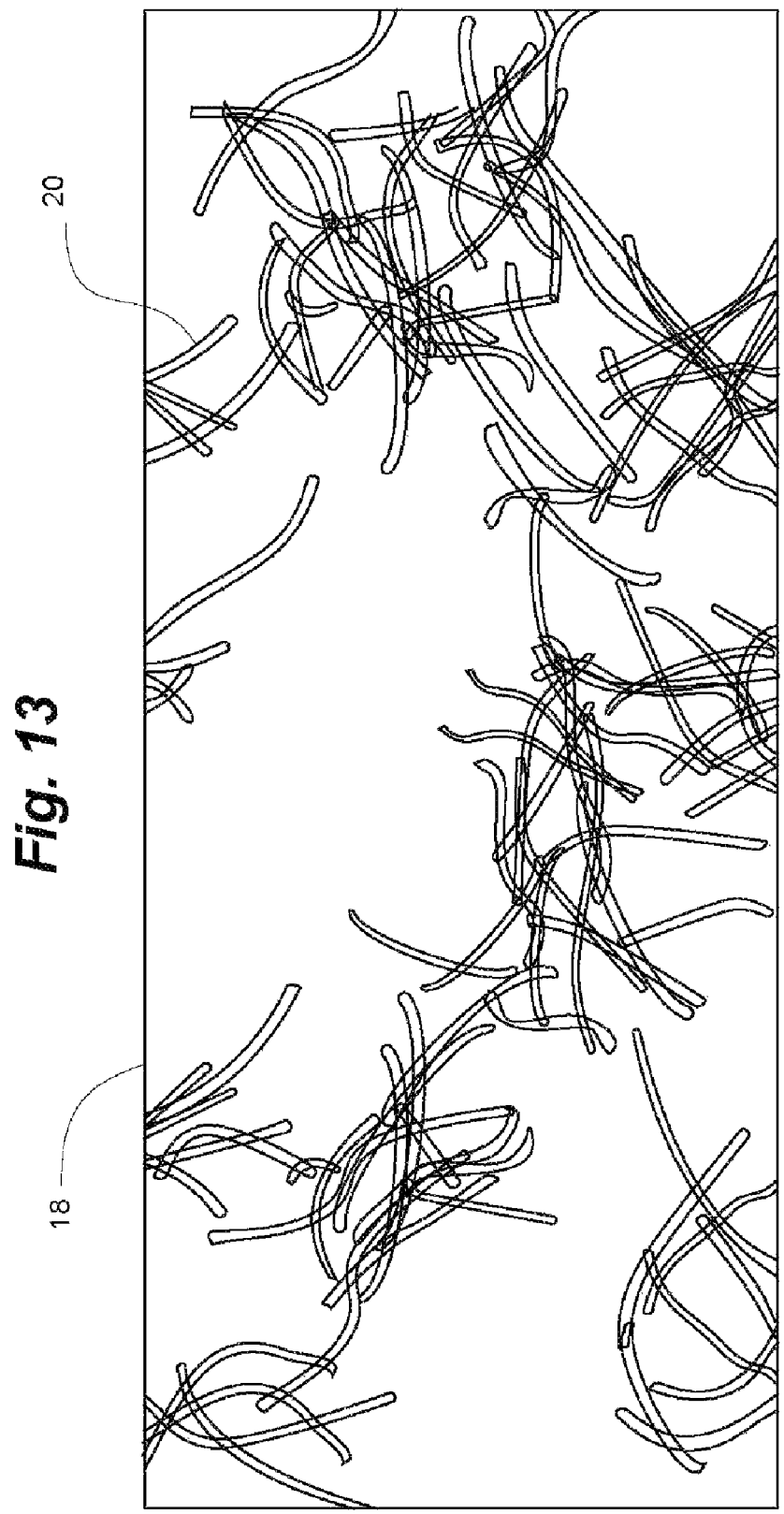
FIG. 13 is yet another schematic magnified top image of a surface bearing a coating comprising carbon nanotubes.

In the embodiment of FIG. 1, the coating 50 consists essentially of carbon nanotubes, optionally together with other carbon-containing material (and/or material from the catalyst (s) used to produce the carbon nanotubes). Carbon nanotubes 20 are provided over (optionally directly over) the surface 18. Further, the carbon nanotubes here are exposed (i.e., they define the outermost portion of the coating). In some cases, the nanotubes cover substantially the entire surface 18. FIG. 11 schematically depicts a 100 percent coverage situation. In this schematic figure, nanotubes below the illustrated tubes are not shown. However, in the areas that appear to be open space in this two-dimensional figure, there would actually be other carbon nanotubes below these spaces (this, however, is not the case for FIGS. 12 and 13) so as to provide 100 percent coverage. In other cases, the nanotubes cover only part of the surface 18. For example, the coverage can optionally be less than or equal to about 60 percent, less than or equal to about 50 percent, or less than or equal to about 30 percent. FIGS. 12 and 13 schematically depict embodiments where the coverage is less than 60 percent and less than 50 percent, and FIG. 13 schematically depicts an embodiment where the coverage is less than 30 percent. Preferably, the nanotubes cover at least about 1-2 percent of the surface 18.

In the embodiment of FIG. 2, the coating 50 comprises carbon nanotubes 20 and transparent dielectric film 30. The carbon nanotubes 20 can be provided over the surface so as to provide any desired coverage, such as any coverage range noted above. Preferably, the transparent dielectric film 30 is provided over (e.g., so as to embed) at least some of the carbon nanotubes 20. In the illustrated embodiment, the dielectric film 30 is entirely over the nanotubes 20. In other cases, the film 30 covers only parts, or some, of the nanotubes. For example, some of the nanotubes may be covered whereas others may project somewhat from the top surface of the film 30. The coating here, for example, can have a thickness of less than 10,000 angstroms, less than 4,000 angstroms, or less than 1,500 angstroms.

FIG. 3 illustrates an embodiment wherein the coating 50 is a graded coating comprising both carbon nanotubes 20 and transparent dielectric film 30. In certain cases, the graded coating comprises, from the substrate surface 18 outwardly, a generally continuously increasing concentration of transparent dielectric film 30 and a generally continuously decreasing concentration of carbon nanotubes 20. In other cases, the graded coating comprises, from the substrate surface 18 outwardly, a generally continuously increasing concentration of carbon nanotubes 20 and a generally continuously decreasing concentration of transparent dielectric film 30. This could be achieved through methods in which a transparent dielectric film is deposited before (e.g., under) the carbon nanotubes.

The coating 50 in any of the illustrated embodiments can have a thickness of anywhere between about 100 angstroms and about 30,000 angstroms, depending on the desired conductivity and transmission properties of the coating. Moreover, some applications may call for even greater thicknesses. The more narrow exemplary thickness ranges noted above may be preferable in embodiments of this disclosure.

Once the substrate is coated, a heat treatment can optionally be performed on the coated substrate. This may involve tempering, heat strengthening, delivering energy to the coated substrate using a pulse of light or a pulse of plasma, etc. The coated substrate, though, is by no means required to be heat treated in all embodiments.

In one particular embodiment, a sheet of soda-lime glass is coated with carbon nanotubes at a coverage of about 30% and a thickness of about 100 Å. The carbon nanotubes are deposited by spray deposition. Synthesized nanotubes (such as tubes obtained commercially from Carbon Solutions, Inc.) are dissolved in a solvent (e.g., water or organic material such as isopropanol). In some cases, the nanotubes are functionalized so they will dissolve in the desired solvent. A 60-minute treatment in an ultrasonicator in isopropanol, water, or other solvent may be useful. In other cases, the tubes can be suspended in a stable solution using a surfactant, such as sodium dodecyl sulfate (SDS). The solution can be sprayed (e.g., using an ultrasonic sprayer) onto the sheet of glass so that a coverage of about 30% is obtained. In many cases, the solvent evaporates from the glass sheet, so that primarily the nanotubes remain. In certain cases, it may be desirable to heat the substrate to increase the rate of solvent evaporation. The glass sheet thus coated with carbon nanotubes on one of its major surfaces is then conveyed through a sputter coater, in which titanium oxide film is sputter deposited over the carbon nanotubes 20 at a theoretical thickness of about 40 Å. The film can be deposited by sputtering a titanium target in an oxidizing atmosphere or by sputtering a titanium oxide target (such as a substoichiometric titania target) in an inert atmosphere. Useful substoichiometric titania targets can be obtained commercially from Bekaert VDS (Deinze, Belgium). Targets of this nature and useful sputter deposition methods are described in U.S. Pat. Nos. 6,511,587, 6,468,402, and 6,461,682, the salient teachings of which regarding titania targets and useful deposition methods are incorporated herein by reference.

Figure 4:
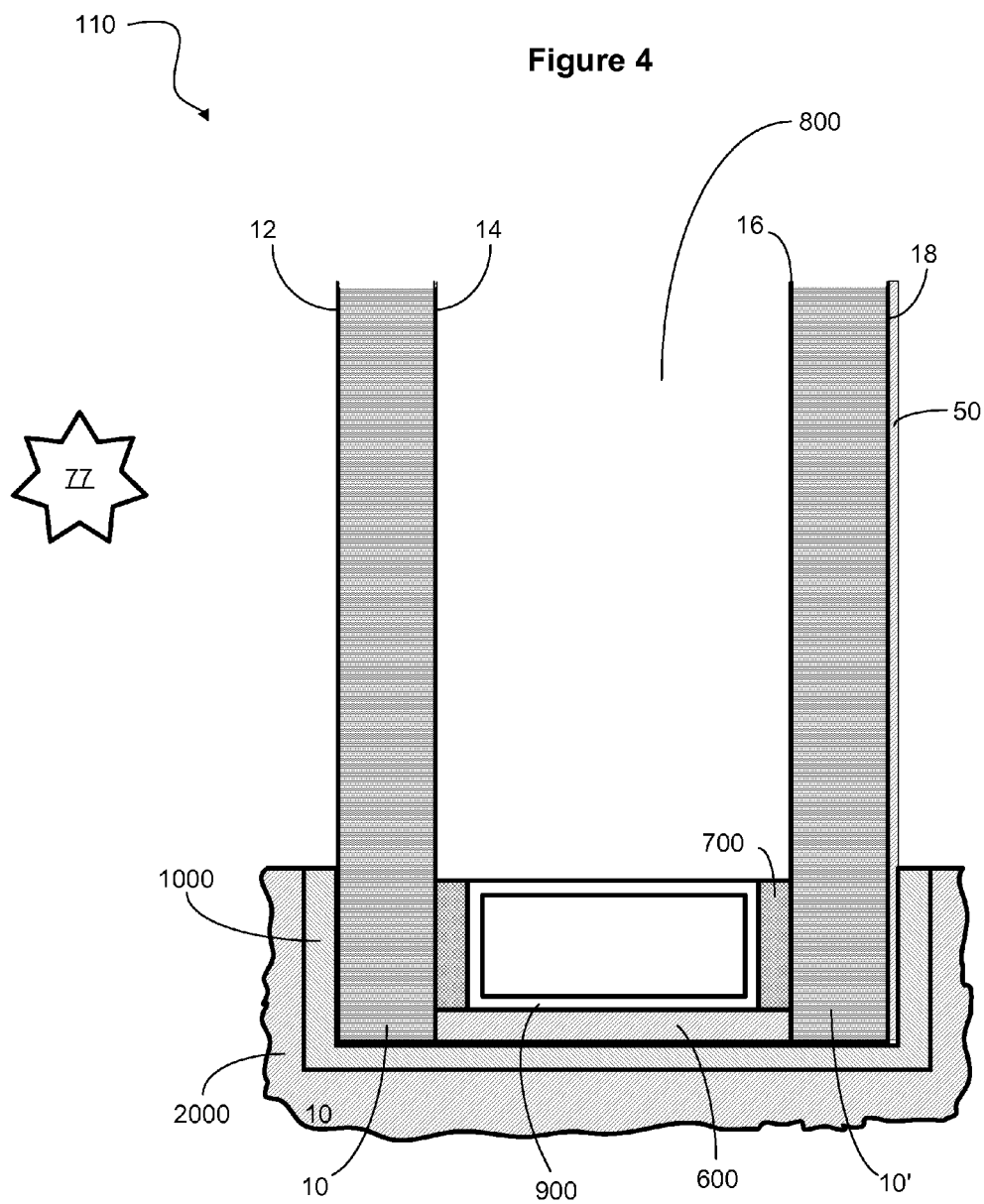
FIG. 4 is a partially broken-away schematic cross-sectional side view of a multiple-pane insulating glazing unit that is mounted in a frame on a wall of a building in accordance with certain embodiments of the invention.
Figure 5:
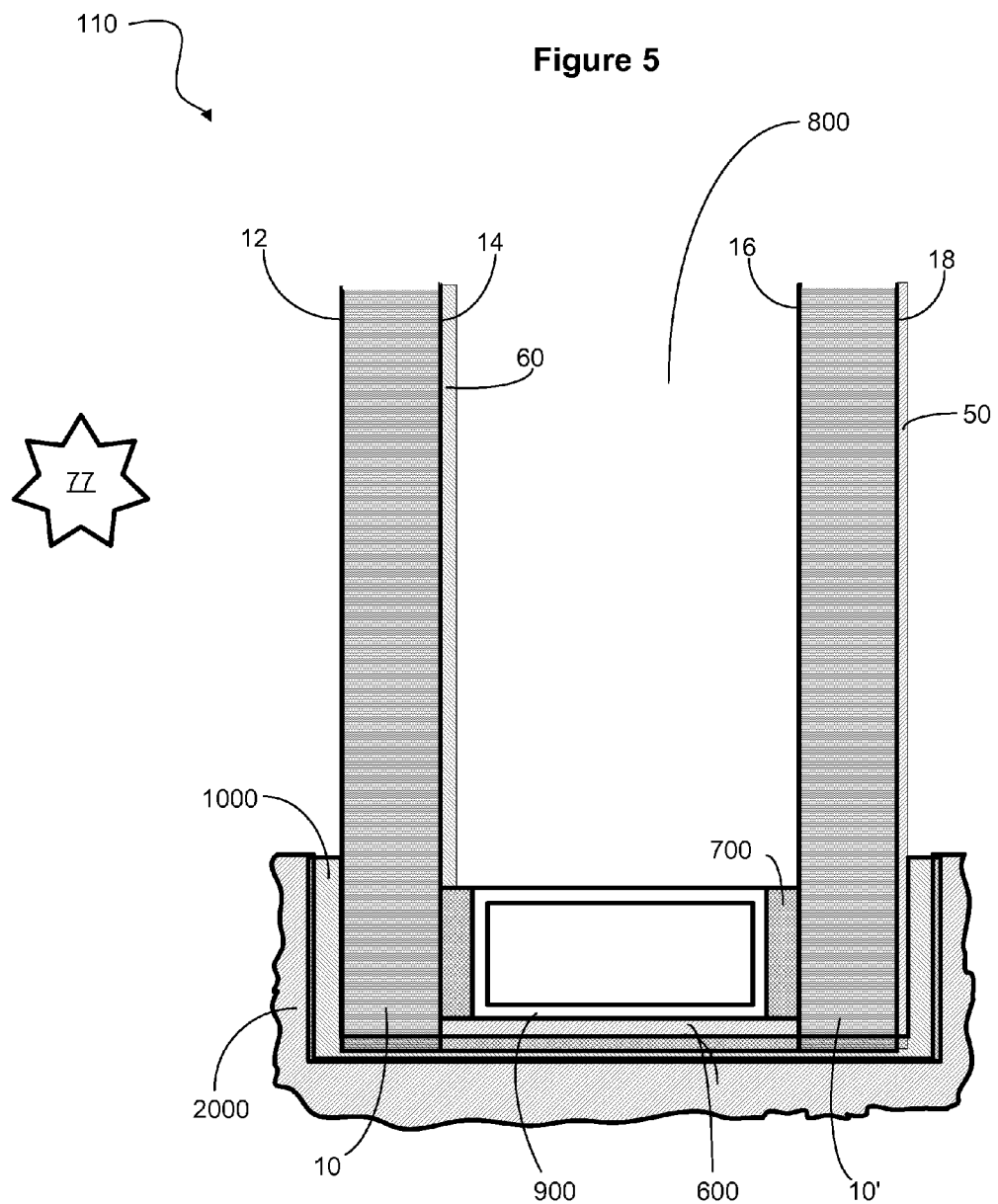
FIG. 5 is a partially broken-away schematic cross-sectional side view of a multiple-pane insulating glazing unit that is mounted in a frame on a wall of a building in accordance with certain embodiments of the invention.
Figure 6:
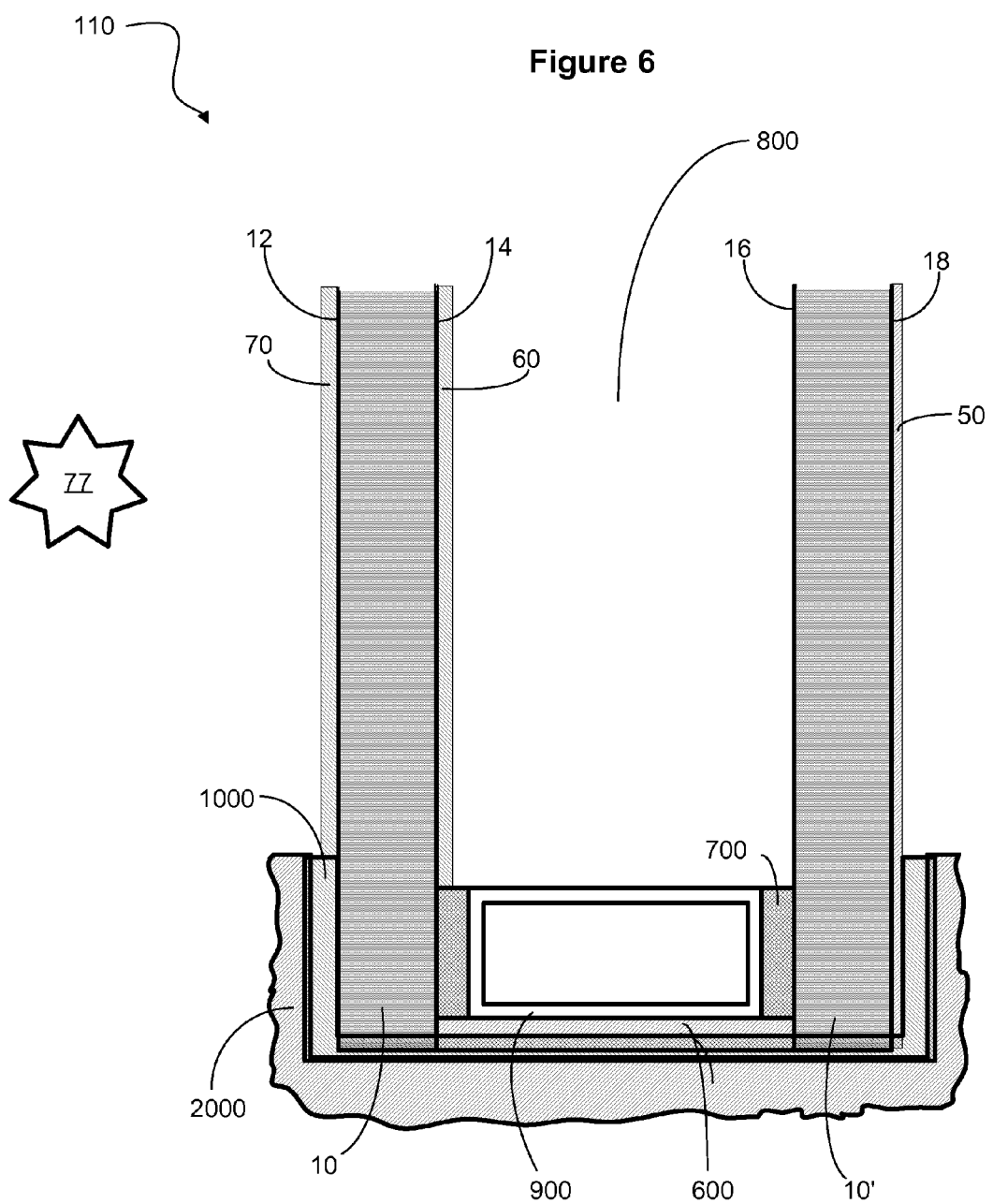
FIG. 6 is a partially broken-away schematic cross-sectional side view of a multiple-pane insulating glazing unit that is mounted in a frame on a wall of a building in accordance with certain embodiments of the invention.

The invention also provides an IG unit having at least one transparent pane bearing a coating comprising carbon nanotubes. In some cases, the coating is on a #1 surface of the unit. In other cases, the coating is on a #4 surface of the unit, or on a #6 surface of the unit. Still further, the unit can have such coatings on both #1 and #4 surfaces, or on both #1 and #6 surfaces, etc. Thus, the unit can be a double-pane unit, triple-pane unit, etc. With reference to FIGS. 4-6, in certain embodiments, an IG unit 110 is provided having a first pane 10 and a second pane 10' separated by a between-pane space 800. A spacer 900 (which can optionally be an integral part of a sash, frame, etc.) is commonly provided to separate the panes 10 and 10'. In the illustrated embodiments, the IG unit is mounted in a frame 1000 which is mounted in a building 2000, although this is by no means required. The spacer can be secured to the inner surfaces of the panes using an adhesive 700. In some cases, an end sealant 600 is also provided. In the illustrated embodiment, the first pane 10 has an outer surface 12 (the #1 surface) and an inner surface 14 (the #2 surface). The illustrated second pane 10' has an inner surface 16 (the #3 surface) and an outer surface 18 (the #4 surface). The first pane 10 can optionally be an outboard pane. For example, it can be mounted in a frame 1000 (a window frame, door frame, skylight frame, etc.) such that its outer surface 12 is exposed to an outdoor environment. The illustrated inner surfaces 14 and 16 are both exposed to the atmosphere (which optionally comprises argon or another insulative gas) in the between-pane space 800 of the IG unit. The second pane 10 can optionally be an inboard pane, such that its outer surface 18 is a room-side surface (i.e., a surface exposed to an indoor environment).

For embodiments where the coating 50 is on the #1 surface of an IG unit, the unit can be an advantageous anti-condensation insulating glazing unit.

In FIGS. 4-6, the surface 18 (the #4 surface) of the unit bears a coating 50 comprising carbon nanotubes. In some embodiments involving a monolithic glazing, the #2 surface can have such a coating. Further, in triple glazing embodiments, the #6 surface can have such a coating. The coating 50 can be any one of the coating embodiments already described with reference to FIGS. 1-3. In the illustrated embodiments, the second pane 10' bears the coating 50. However, the first pane 10 can also (or alternatively) bear a coating comprising carbon nanotubes. In the embodiment of FIG. 4, the unit 110 is only provided with a coating 50 comprising carbon nanotubes. That is, only the outer surface 18 of the second pane 10' is provided with a coating 50 while the surfaces 12, 14 and 16 are uncoated.

Figure 7:
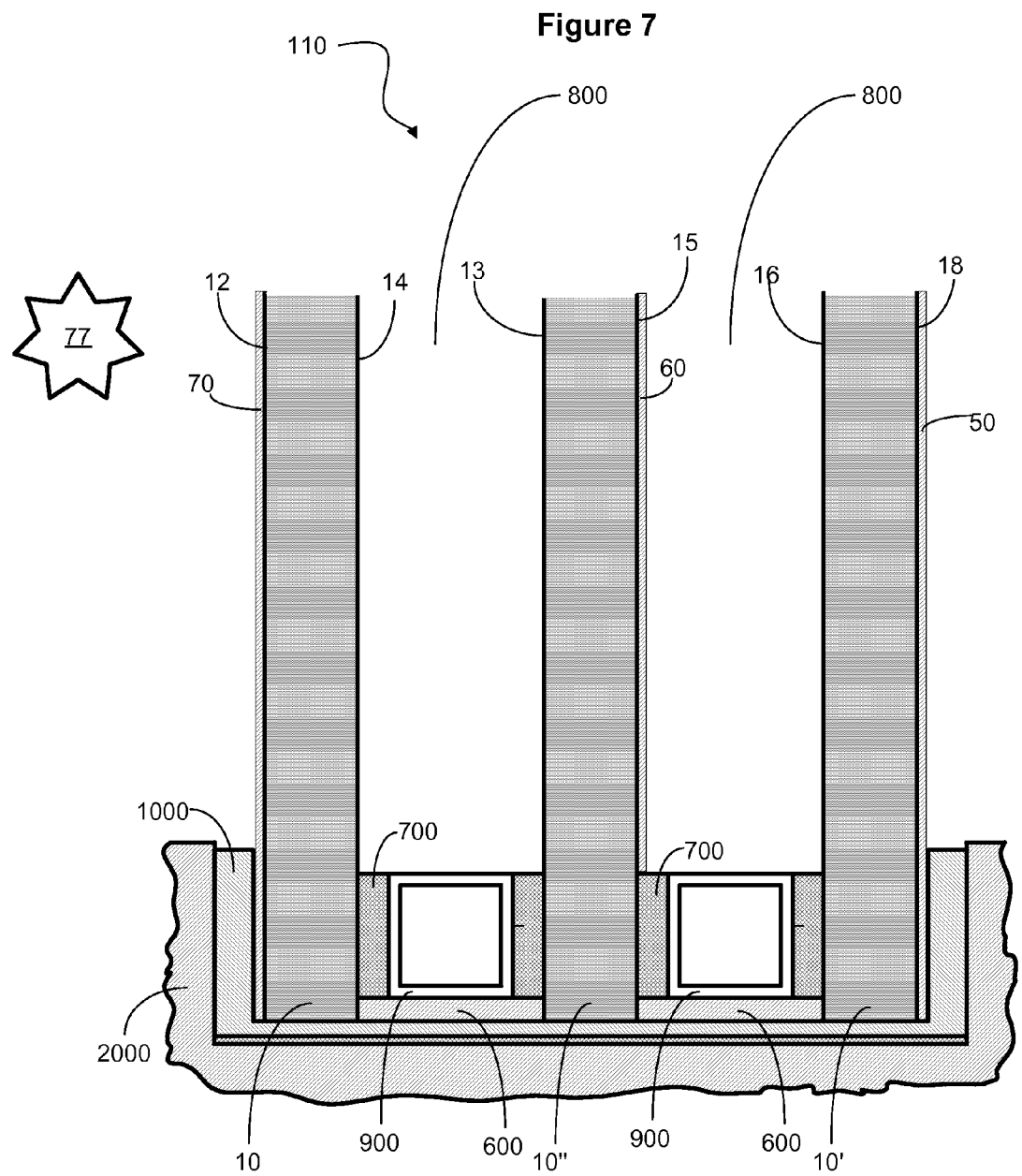
FIG. 7 is a partially broken-away schematic cross-sectional side view of a multiple-pane insulating glazing unit that is mounted in a frame on a wall of a building in accordance with certain embodiments of the invention.

In other cases, the IG unit 110 also has a functional coating (e.g., a low-emissivity coating) on another surface (e.g., the #2 surface or #3 surface). In the embodiment illustrated in FIG. 5, the IG unit 110 has a #2 surface provided with a low-emissivity coating 60 and a #4 surface provided with a coating 50 comprising carbon nanotubes. In another embodiment (as illustrated in FIG. 7), a triple-pane IG unit has a coating comprising carbon nanotubes on a #6 surface in combination with a low-emissivity coating on a #2 surface or a #4 surface (or low-emissivity coatings may be on both the #2 and #4 surfaces). The low-emissivity coating 60 can be any such coating known in the art. The coating can have one, two, three or more infrared-reflective films. Low-emissivity coatings having one or two infrared-reflective films are known in the art. Suitable low-emissivity coatings having three or more infrared-reflective films are described in Applicant's own U.S. patent application Ser. No. 11/360,266, the entire contents of which are incorporated herein by reference.

One particular embodiment group provides a multiple-pane IG unit having one major surface (preferably, a #4 surface or a #6 surface) bearing a coating comprising carbon nanotubes and another major surface bearing a low-emissivity comprising three infrared-reflective film regions (each optionally comprising silver). In some embodiments of this nature, the IG unit also has a major surface (preferably a #1 surface) bearing a low-maintenance coating, such as a hydrophilic and/or photocatalytic coating. In one particular embodiment, the low-maintenance coating, the low-emissivity coating, and the coating comprising carbon nanotubes have a combined thickness of less than 10,000 angstroms (e.g., between 1,000 and 10,000 angstroms), perhaps even less than about 5,000 angstroms (e.g., between about 1,000 angstroms and about 5,000 angstroms). This can provide a particularly good combination of functional coating properties while simultaneously producing desirable optics/appearance features.

With reference to FIG. 6, the IG unit 110 can be provided with a low-maintenance coating 70 on the exterior surface 12 (the #1 surface). The low-maintenance coating can, for example, comprise silica and/or titania. Suitable low-maintenance coatings are described in applicant's own U.S. patent application Ser. Nos. 11/021,482, 11/179,178, 11/179,852, 11/129,820, and 11/293,032, the entire contents of each of which are incorporated herein by reference. In this embodiment, the IG unit 110 has a #1 surface provided with a low-maintenance coating 70, a #2 surface provided with a low-emissivity coating 60 (optionally having one, two, or three silver-containing layers) and a #4 surface provided with a coating 50 comprising carbon nanotubes. In some cases, the low-maintenance coating 70, the low-emissivity coating 60, and the coating 50 comprising carbon nanotubes have a combined physical thickness of less than about 5,000 angstroms, such as between about 1,000 angstroms and about 5,000 angstroms. For example, one embodiment provides a double-pane IG unit having a low-maintenance coating formed by about 75 Å of silica film (optionally containing alumina or the like) directly over the #1 surface with about 25-40 Å of $TiO_2$ directly over the silica, a coating formed by carbon nanotubes directly over the #4 surface and having a thickness of about 100 Å at 30% coverage and a low-emissivity coating formed by the following sequence of films over the #2 surface: about 130 Å of $TiO_2$/about 120 Å of Ag/about 20 Å of Ti (optionally being at least partially oxidized)/about 470 Å of $TiO_2$/about 150 Å of Ag/about 20 Å of Ti (optionally oxidized at least in part)/about 550 Å of $TiO_2$/about 205 Å of Ag/about 20 Å of Ti (optionally oxidized at least in part)/about 280 Å of $TiO_2$.

FIG. 7 depicts a triple pane IG unit 110. Here, the IG unit 110 is provided having a first pane 10, a second, middle pane 10', and a third pane 10". The first pane 10 and second pane 10' are separated by a between-pane space 800 and the second pane 10' and the third pane 10" are separated by a between-pane space 800'. A spacer 900 (which can optionally be an integral part of a sash, frame, etc.) is commonly provided to separate the panes 10 and 10' and a spacer 900' is provided to separate the panes 10' and 10". The spacers can be secured to the inner surfaces of the panes using adhesive 700. In some cases, end sealants 600 are also provided. In the illustrated embodiment, the first pane 10 has an outer surface 12 (the #1 surface) and an inner surface 14 (the #2 surface). The illustrated second pane 10' has a surface 13 (the #3 surface) and a surface 15 (the #4 surface). The illustrated third pane 10" has an inner surface 16 (the #5 surface) and an outer surface 18 (the #6 surface). The first pane 10 can optionally be an outboard pane. For example, it can be mounted in a frame 1000 (a window frame, door frame, skylight frame, etc.) such that its outer surface 12 is exposed to an outdoor environment. The illustrated inner surfaces 14, 13, 15, 16 are exposed to the atmosphere in the between-pane spaces 800, 800' of the IG unit. The third pane 10" can optionally be an inboard pane, such that its outer surface 18 is a room-side surface.

With continued reference to FIG. 7, the surface 18 (the #6 surface) of the unit bears a coating 50 comprising carbon nanotubes. The coating 50 can be any one of the coating embodiments already described with reference to FIGS. 1-3. The surface 15 (the #4 surface) bears a low-emissivity coating 60. Of course, a low-emissivity coating can (additionally or alternatively) be provided on surface 14 (the #2 surface), surface 13 (the #3 surface) or surface 16 (the #5 surface). The low-emissivity coating 60 can be any such coating known in the art. A low-maintenance coating 70 is also provided on the exterior surface 12 (the #1 surface) in the illustrated embodiment. In one variant, the only coating on the IG unit is the coating 50 on the #6 surface. In another variant, only the coatings 50 and 70 are provided.

The present coating comprising carbon nanotubes has a number of beneficial properties. The ensuing discussion reports several of these properties. In some cases, properties are reported herein for a single (i.e., monolithic) pane bearing the present coating 50 on one surface. In other cases, these properties are reported for a double-pane IG unit having the present coating 50 on its #4 surface 18. In such cases, the reported properties are calculated for a double-pane IG unit wherein both panes are clear 2.2 mm soda lime float glass with a ½ inch between-pane space filled with an insulative gas mix of 90% argon and 10% air. Of course, these specifics are by no means limiting to the invention. Absent an express statement to the contrary, the present discussion reflects determinations that can be made using the well known WIN-DOW 5.2a computer program (e.g., calculating center of glass data) under standard ASHRAE conditions.

Due to the electrical conductivity of the carbon nanotubes, the coating 50 can provide exceptional thermal insulating properties. In some embodiments, the thickness, nanotube coverage, and composition of the coating 50 are selected such that the coating 50 exhibits a sheet resistance of less than about 100 ohms per square, less than about 50 ohms per square or less than about 20 ohms per square. The sheet resistance of the coating can be measured in standard fashion using a 4-point probe. Other methods known in the art as being useful for calculating sheet resistance can also be used.

In certain embodiments, the invention provides an IG unit having a U value of less than 0.24 and more preferably less than 0.21. As is well known, the U value of a glazing is a measure of the thermal insulating property of the unit. The smaller the U value, the better the insulating property. The term U Value is well known in the art. Here, the IG unit can be of the type shown in FIG. 4 (having only coating 50), of the type shown in FIG. 5 (having both coatings 50 and 60), or of the type shown in FIG. 6 (having coatings 50, 60 and 70). Thus, in some cases, the thickness, nanotube coverage, and composition of the coating 50 are selected such that providing only this coating 50 on the IG unit results in the unit having a U value within one or more of the ranges noted in this paragraph. In other cases, the IG unit reaches the desired low U value by virtue of the combined effects of two or more coatings, e.g., coatings 50 and 60.

In some cases, the coating has a thickness, nanotube coverage, and composition selected to provide the IG unit with a $\Delta U$ of at least about 0.03. The $\Delta U$ is defined as the absolute value of the difference between the U value of the unit with the coating 50 and the U value of the unit without the coating 50.

The coating 50 can also have exceptionally low emissivity. For example, in some embodiments, the emissivity of the coating 50 is less than about 0.25. The term "emissivity" is well known in the present art. This term is used herein in accordance with its well-known meaning to refer to the ratio of radiation emitted by a surface to the radiation emitted by a blackbody at the same temperature. Emissivity is a characteristic of both absorption and reflectance. It is usually represented by the formula: E=1−Reflectance. The present emissivity values can be determined as specified in "Standard Test Method For Emittance Of Specular Surfaces Using Spectrometric Measurements" NFRC 301-93, the entire teachings of which are incorporated herein by reference. Emissivity can be calculated by multiplying the measured sheet resistance by 0.016866. Using this method, a coating 50 that provides sheet resistance of about 1.25, for example, can be determined to have an emissivity of about 0.021.

In addition to low sheet resistance and low emissivity, the present coating 50 can provide high visible transmission. In some embodiments, the coating 50 provides a visible transmission (for a monolithic pane or an IG unit) of between about 30% and about 75%. For example, a pane bearing the coating 50 may have a monolithic transmission in this range and/or an IG unit with a pane bearing the coating 50 (optionally also having coatings 60 and/or 70 on the appropriate surface(s)) may have an insulated transmission in this range. A monolithic glass pane having on one of its major surfaces a coating formed by carbon nanotubes at a coverage of 50% and a thickness of 50 Å is expected to provide a visible transmission of at least 70%.

The term "visible transmittance" is well known in the art and is used herein in accordance with its well-known meaning. Visible transmittance, as well as visible reflectance, can be determined in accordance with NFRC 300, Standard Test Method for Determining the Solar and Infrared Optical Properties of Glazing Materials and Fading Resistance of Systems (National Fenestration Rating Council Incorporated, adopted December 2001, published January 2002). The well known WINDOW 5.2a computer program can be used in calculating these and other reported optical properties.

In certain cases, the coating 50 has a thickness, nanotube coverage, and composition selected to provide the glazing (e.g., an IG unit) with a $\Delta T_v$ of less than about 5%, or even less than about 2%. The $\Delta T_v$ is defined as the absolute value of the difference between the visible transmittance of the glazing with the coating 50 and the transmittance of the glazing without the coating 50. Thus, the coating 50 can be provided to impart electrical conductivity and/or strength with a minimal attendant decrease in visible transmission. In one embodiment, the coating 50 is formed by carbon nanotubes deposited onto the substrate surface at a thickness of about 100 angstroms and having a surface coverage of about 30%. A coating according to this embodiment is expected to provide a $\Delta T_v$ of less than about 5%.

In addition to these beneficial properties, the present coating 50 desirably facilitates pleasing color properties. The following discussion of transmitted and reflected color is reported using the well known color coordinates of "a" and "b". In particular, these color coordinates are indicated herein using the subscript h (i.e., $a_h$ and $b_h$) to represent the conventional use of the well known Hunter Lab Color System (Hunter methods/units, Ill. D65, 10 degree observer). The present color properties can be determined as specified in ASTM D-2244-93, "Standard Test Method For Calculation Of Color Differences From Instrumentally Measured Color Coordinates", Sep. 15, 1993, as augmented by ASTM E-308-85 Annual Book of ASTM Standards, Vol. 06.01 "Standard Method For Computing The Colors Of Objects By Using The CIE System", the entire teachings of each of which are incorporated herein by reference.

The coating 50 desirably provides an IG unit with a pleasing transmitted color. It is commonly desirable for windows to exhibit hues of blue or blue-green, with blue commonly being especially desired. In some embodiments, the IG unit has a transmitted color characterized by an $a_h$ color coordinate of between about 0 and about −6 and a $b_h$ color coordinate of between about +6 and about −6. One exemplary embodiment of this nature involves a double-pane IG unit where the #4 surface has a coating formed by carbon nanotubes at 50% coverage and an average thickness of about 50 Å, and the #2 surface has a low-emissivity coating formed by the following sequence of films, moving outwardly from the #2 surface: about 165 Å of zinc tin oxide/about 120 Å of Ag/about 20 Å of Ti (optionally being at least partially oxidized/about 590 Å of zinc tin oxide/about 155 Å of Ag/about 20 Å of Ti (optionally being at least partially oxidized)/about 665 Å of zinc tin oxide/about 205 Å of Ag/about 20 Å of Ti (optionally being at least partially oxidized)/about 315 Å of zinc tin oxide (the outermost 100 Å of zinc tin oxide can optionally be replaced with 100 Å of silicon nitride).

The coating 50 desirably provides an IG unit with a reflected color that is pleasing. The reflected color reported herein is measured from the #1 surface of the IG unit. In some embodiments, the coating is on an IG unit having an exterior reflected color characterized by an $a_h$ color coordinate of between about +2 and about −6 and a $b_h$ color coordinate of between about +6 and about −6. The exemplary embodiment detailed in the paragraph immediately above would be useful.

The invention also provides a laminated glass assembly. Laminated glass assemblies are widely used, for example, in automobile windshields. These assemblies typically comprise two sheets of glass having sandwiched therebetween an interlayer, which holds the glass sheets together. In the present embodiments, the interlayer comprises carbon nanotubes (optionally embedded in, and/or laminated against, a polymeric material) and in some cases consists essentially of carbon nanotubes.

Figure 8:
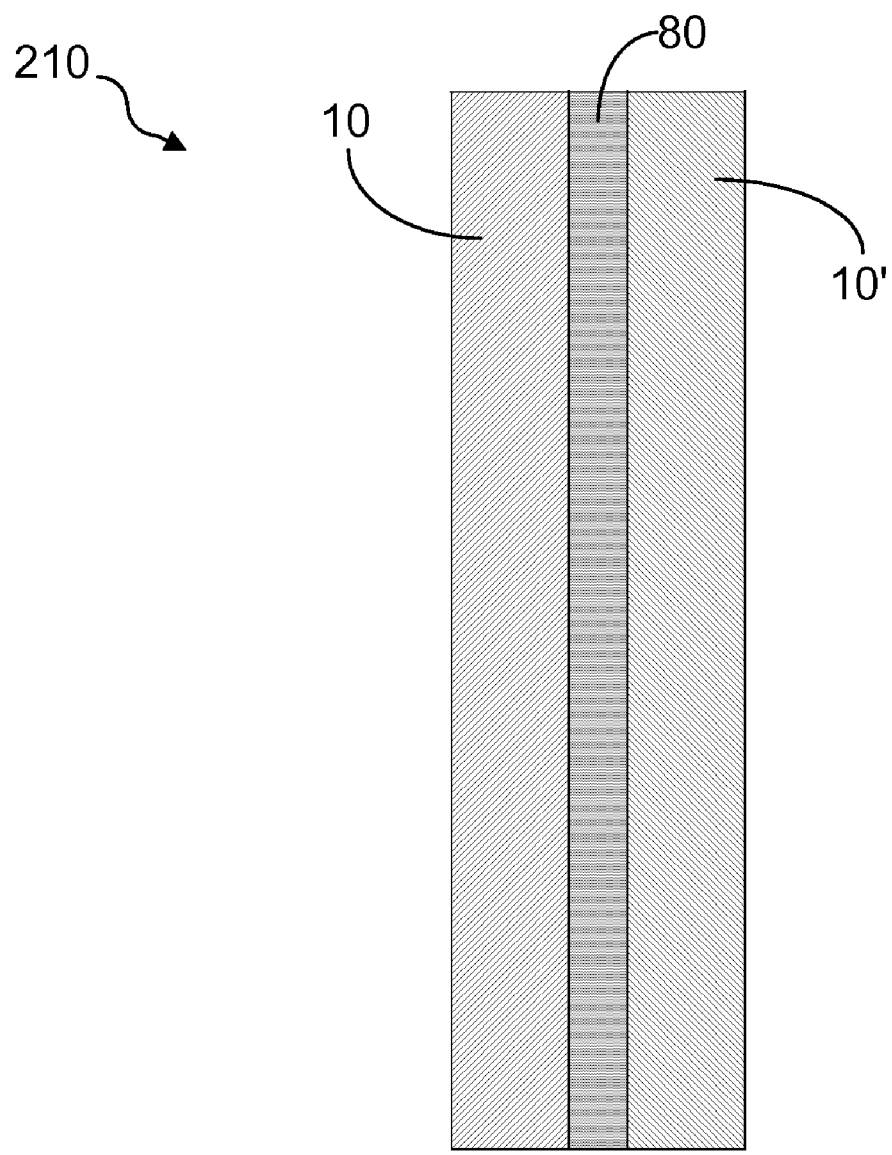
FIG. 8 is a cross-sectional side view of a laminate in accordance with certain embodiments of the invention.

With reference to FIG. 7, in some embodiments, a laminated glass assembly 210 is provided having two panes of glass 10, 10' and an interlayer 70 comprising carbon nanotubes sandwiched between the two panes 10, 10'. With reference to FIG. 8, the interlayer 70 can optionally consist essentially of carbon nanotubes 20, or it can comprises carbon nanotubes together with a desired adhesive and/or binder.

In one laminated glass embodiment, the laminate has an interlayer 70 comprising carbon nanotubes and polymer, and the carbon nanotube/polymer weight ratio is between about 0.0001 and about 1.0. The carbon nanotube/polymer weight ratio is the total weight of the carbon nanotubes over the weight of the polymer in the interlayer.

Figure 9:
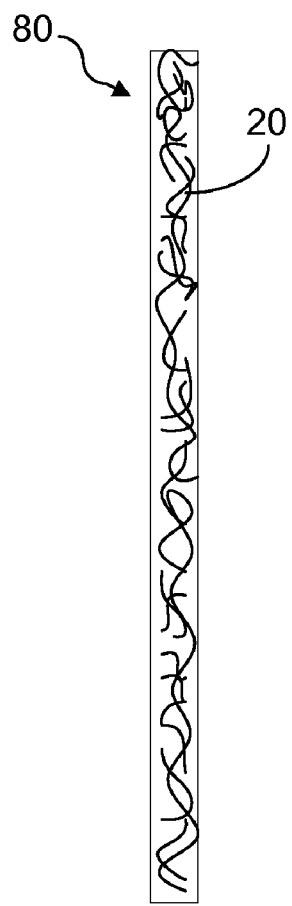
FIG. 9 is a cross-sectional side view of an interlayer of a laminate in accordance with certain embodiments of the invention.
Figure 10:
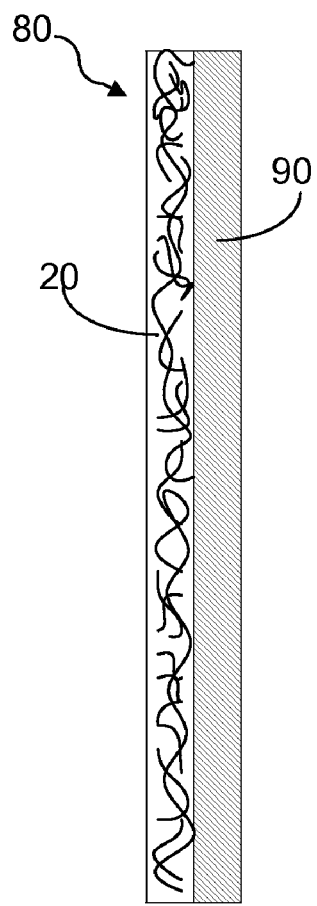
FIG. 10 is a cross-sectional side view of an interlayer of a laminate in accordance with certain embodiments of the invention.

On the other hand, with reference to FIG. 9, the interlayer 80 can comprise both carbon nanotubes and a polymeric material. In FIG. 9, the interlayer 80 includes a film 90 of polymeric material contiguous to (optionally laminated against a layer of) carbon nanotubes. The polymeric material, in some cases, is polyvinyl buteral (PVB), silicone, or an Ionoplast plastic. Both the film 90 and nanotubes 20 are sandwiched between the two panes 10, 10'. In some cases, a laminated glass assembly 210 of this type is assembled by first depositing carbon nanotubes 20 on one or more surfaces of the polymeric film 90. The polymeric film 90 carrying the nanotubes 20 may then be positioned between the two glass sheets to form a sandwich, which is then heated. The carbon nanotubes 20 can alternatively be deposited directly on one or more surfaces of the two panes before the polymeric film 90 is positioned between the two panes. In another example, a single (e.g., self-supporting) interlayer comprises carbon nanotubes embedded in a sheet of polymeric material. In still another example, the laminated glazing assembly includes two panes between which are located two coatings each comprising carbon nanotubes, where sandwiched between such two coatings is a layer comprising a material selected from the group consisting of PVD, silicone, and Ionoplast plastic.

Once the laminated glass is assembled, the assembly 210, in some cases, is heated (commonly to a temperature between about 120 degrees F. and about 170 degrees F.) and roller pressed to initiate removal of air trapped between the interlayer and the glass panes and to initiate adhesion of the interlayer to the glass panes. In some embodiments, the assembly 210 is then processed using an autoclave process. An autoclave operation typically involves exposing the assembly 210 to an elevated temperature (commonly between about 275 degrees F. and about 300 degrees F.) and an elevated atmospheric pressure (commonly between about 150-190 psig) until there is achieved adhesion of the interlayer 70 to the glass and solution within the interlayer 70 of an entrapped air. Suitable autoclave processes that can be used to process laminated glass assemblies of the present embodiments are described in U.S. Pat. No. 3,234,062 and U.S. Pat. No. 5,536,347, the contents of each of which concerning autoclave techniques and equipment are incorporated herein by reference.

In other embodiments, the assembly 210 is processed using a non-autoclave process. One suitable non-autoclave operation that can be used is described in Applicant's own U.S. patent application Ser. Nos. 10/393,197 and 10/943,797, the entire contents of each of which concerning non-autoclave techniques and equipment are incorporated herein by reference. Any suitable processing method can be used to ensure adhesion of the interlayer to the glass panes.

While a preferred embodiment of the present invention has been described, it should be understood that various changes, adaptations and modifications may be made therein without departing from the spirit of the invention and the scope of the appended claims.

What is claimed is:

1. A multiple-pane insulating glazing unit including at least two spaced-apart panes, the insulating glazing unit having at least one between-pane space and having a desired surface on which there is provided a transparent conductor coating consisting essentially of carbon nanotubes and inorganic dielectric material, the desired surface being an exterior surface of the unit rather than being an interior surface facing a between-pane space of the unit.

2. The insulating glazing unit of claim 1 wherein the transparent conductor coating has a thickness, nanotube coverage, and composition selected to provide the unit with a $\Delta U$ of at least about 0.03, the $\Delta U$ being defined as an absolute value of a difference between U value of the unit with the transparent conductor coating and U value of the unit without the transparent conductor coating.

3. The insulating glazing unit of claim 2 wherein the transparent conductor coating has a thickness of less than 10,000 angstroms and yet the $\Delta U$ is at least about 0.03.

4. The insulating glazing unit of claim 1, the coating being durable to heat treatment at elevated temperatures exceeding 600 degrees C. such that the coating remains transparent in response to such heat treatment rather than browning or otherwise turning opaque.

5. The insulating glazing unit of claim 1, the coating being characterized by a dielectric/carbon nanotube weight ratio of between about 2.3 and about 999, the dielectric/carbon nanotube weight ratio being defined as the total weight of the dielectric material over the total weight of the carbon nanotubes.

6. The insulating glazing unit of claim 5 wherein the dielectric/carbon nanotube weight ratio is between about 9 and about 999.

7. The insulating glazing unit of claim 1 wherein the dielectric material is selected from the group consisting of metal oxides, metal nitrides, and metal oxynitrides.

8. The insulating glazing unit of claim 1 wherein the carbon nanotubes are encased in a matrix of the dielectric material.

9. The insulating glazing unit of claim 1 wherein the dielectric material is an amorphous or substantially amorphous dielectric material selected from the group consisting of silica, silicon nitride, and silicon oxynitride.

10. The insulating glazing unit of claim 1 wherein the desired surface is either a #4 surface or a #6 surface of the unit, and wherein the unit is mounted in a frame on a wall of a building, the unit having a #1 surface exposed to an outdoor environment and a #2 surface exposed to a between-pane space of the unit, the desired surface being a room-side surface exposed to an indoor environment of the building, wherein the carbon nanotubes cover less than 100% of the room-side surface, and the coating includes a transparent dielectric film encasing the carbon nanotubes.

11. The insulating glazing unit of claim 10 wherein the carbon nanotubes cover less than about 50 percent of the room-side surface.

12. The insulating glazing unit of claim 10 wherein the carbon nanotubes cover less than about 30 percent of the room-side surface.

13. The insulating glazing unit of claim 1 wherein the unit has a U value of less than 0.24.

14. The insulating glazing unit of claim 13 wherein the U value is less than 0.21.

15. The insulating glazing unit of claim 1 wherein the transparent conductor coating provides an emissivity of less than about 0.25.

16. The insulating glazing unit of claim 1 wherein the transparent conductor coating has a thickness, nanotube coverage, and composition selected to provide a $\Delta Tv$ of less than about 5%, the $\Delta Tv$ being defined as an absolute value of a difference between visible transmittance of the unit with the transparent conductor coating and visible transmittance of the unit without the transparent conductor coating.

17. The insulating glazing unit of claim 1 wherein the unit has a visible transmission between about 30% and about 75%.

18. The insulating glazing unit of claim 1 wherein the unit has a #2 surface on which there is provided a low-emissivity coating, the low-emissivity coating comprising at least one infrared-reflective film comprising silver, said infrared-reflective film being located between two transparent dielectric films.

19. The insulating glazing unit of claim 18 wherein the unit has a #1 surface on which there is provided a water-sheeting coating.

20. The insulating glazing unit of claim 19 wherein the water-sheeting coating includes silica, titania, or both, and wherein the transparent conductor coating, the low-emissivity coating, and the water-sheeting coating have a combined physical thickness of between 1,000 angstroms and 10,000 angstroms.

21. The insulating glazing unit of claim 19 wherein the transparent conductor coating, the low-emissivity coating, and the water-sheeting coating have a combined physical thickness of between about 1,000 angstroms and about 5,000 angstroms.

22. The insulating glazing unit of claim 1 where the unit has a transmitted color characterized by an ah color coordinate of between about 0 and about −6 and a bh color coordinate of between about +6 and about −6.

23. The insulating glazing unit of claim 10 wherein the unit has an exterior reflected color characterized by an ah color coordinate of between about +2 and about −6 and a bh color coordinate of between about +6 and about −6.

24. The insulating glazing unit of claim 1 wherein the transparent conductor coating has a thickness of less than 10,000 angstroms.

25. The insulating glazing unit of claim 1 wherein the transparent conductor coating has a thickness of less than about 1,500 angstroms.

26. The insulating glazing unit of claim 1 wherein the desired surface is a #1 surface of the unit, and the unit is mounted in a frame on a wall of a building, the #1 surface being exposed to an outdoor environment, the unit having a #2 surface exposed to a between-pane space of the unit.

27. The insulating glazing unit of claim 26 wherein the unit has a room-side surface exposed to an indoor environment, the room-side surface bearing a second transparent conductor coating comprising carbon nanotubes.

28. The insulating glazing unit of claim 27 wherein the room-side surface is either a #4 surface of the unit or a #6 surface of the unit.

29. A glazing comprising a transparent pane having a major surface on which there is provided a coating consisting essentially of inorganic dielectric film and carbon nanotubes, the coating having a thickness of less than 10,000 angstroms, wherein the coating has a dielectric/carbon nanotube weight ratio of between about 2.3 and about 9999, the dielectric/ carbon nanotube weight ratio being defined as the total weight of the dielectric film over the total weight of the carbon nanotubes.

30. The glazing of claim 29 wherein the coating consists essentially of carbon nanotubes and a dielectric material selected from the group consisting of metal oxides, metal nitrides, and metal oxynitrides, wherein the coating is durable to heat treatment at elevated temperatures exceeding 600 degrees C. such that the coating remains transparent in response to such heat treatment rather than browning or otherwise turning opaque.

31. The glazing of claim 29 wherein the dielectric film is an electrically non-conductive dielectric material.

32. The glazing of claim 29 wherein the dielectric film is an amorphous or substantially amorphous dielectric material selected from the group consisting of silica, silicon nitride, and silicon oxynitride.

33. The glazing of claim 29 wherein the carbon nanotubes are encased in the dielectric film.

34. The glazing of claim 29 wherein the thickness of the coating is less than 4,000 angstroms.

35. The glazing of claim 34 wherein the thickness is less than 1,500 angstroms.

36. The glazing of claim 29 wherein the major surface has a total surface area of which the carbon nanotubes cover less than about 50 percent.

37. The glazing of claim 36 wherein the carbon nanotubes cover less than about 30 percent of the total surface area of the major surface.

38. The glazing of claim 29 wherein the carbon nanotubes provide coverage over at least about 1-2 percent of the major surface.

39. The glazing of claim 29 wherein the coating has a surface resistance of less than about 20 ohms per square.

40. The glazing of claim 29 wherein the coated transparent pane has a monolithic transmission of at least about 70 percent.

41. The glazing of claim 29 wherein the glazing includes a further pane on which there is provided a coating comprising three infrared-reflective films each comprising silver.

* * * * *